United States Patent [19]

McCurdy et al.

[11] Patent Number: 5,451,457
[45] Date of Patent: Sep. 19, 1995

[54] METHOD AND MATERIAL FOR PROTECTING GLASS SURFACES

[75] Inventors: Richard J. McCurdy, Toledo; Kenneth J. Heater, Columbus; Alice B. Parsons, Pataskala; J. David Robbins, Worthington, all of Ohio

[73] Assignee: Libbey-Owens-Ford Co., Toledo, Ohio

[21] Appl. No.: 170,532

[22] Filed: Dec. 20, 1993

[51] Int. Cl.⁶ .............................................. B32B 17/10
[52] U.S. Cl. .................................... 428/441; 427/180; 428/426; 428/432
[58] Field of Search ............... 427/180; 428/426, 432, 428/441

[56] References Cited

U.S. PATENT DOCUMENTS

| | | | |
|---|---|---|---|
| 2,995,534 | 8/1961 | Adams et al. | 524/143 |
| 4,011,359 | 3/1977 | Simpkin et al. | 428/326 |
| 4,146,657 | 3/1979 | Gordon | 427/126 |
| 4,187,336 | 2/1980 | Gordon | 428/432 X |
| 4,447,496 | 5/1984 | Franz et al. | 428/432 |
| 4,489,106 | 12/1984 | Duffer et al. | 427/154 |

Primary Examiner—D. S. Nakarani
Attorney, Agent, or Firm—Marshall & Melhorn

[57] ABSTRACT

A method and material is disclosed for protecting glass surfaces in a stack of glass sheets by applying an interleaving material comprised of polyethylene having a number average molecular weight of at least 100,000 to one or both major surfaces of the glass sheets. The glass sheets are then stacked in face-to-face relation for shipment or storage.

8 Claims, No Drawings

METHOD AND MATERIAL FOR PROTECTING GLASS SURFACES

FIELD OF THE INVENTION

The present invention relates generally to a method and material for separating glass sheets and protecting them from marring during storage and shipment, particularly when stacked in a conventional manner. In particular, the present invention relates to the application of a mechanical interleaving material to pyrolytically coated glass sheets prior to stacking. References in this specification to "stacked glass sheets" are to be understood as referring to an assembly of glass sheets whose major surfaces are in adjacent face-to-face relationship.

BACKGROUND OF THE INVENTION

During the storage and transit of stacked glass sheets, a common problem is the deterioration in the quality of the surfaces of the glass sheets. In particular, relative movement between adjacent sheets is liable to cause marring of the adjacent glass surfaces. Marring is a particular problem when stacking glass sheets having pyrolytically deposited coatings thereon.

It is generally known in the art to separate adjacent glass surfaces by interposing sheets of paper between the sheets of glass to protect the glass surfaces. However, techniques that utilize paper interleaving are time consuming and costly. Less expensive methods suggested for separating glass sheets involve the use of particulate interleaving materials, which may include natural products such as wood flour and ground corncobs, or synthetic products such as polyethylene, polystyrene or polyacrylate beads, to name a few. Poly(methyl methacrylate) is currently the predominant material used by the glass industry as an interleaving material.

While the synthetic particulate interleaving materials provide a measure of mar protection at relatively low cost, they are sometimes not sufficient to prevent marring on particular glass products, especially pyrolytically coated glass. Pyrolytic coatings of tin oxide, particularly relatively thick ones, are very susceptible to marring, due to their relatively rough surface topography. Such pyrolytic coatings are commonly utilized, for example, in multiple sheet or insulating glass products, and are described further in U.S. Pat. Nos. 4,146,657 and 4,187,336 to Gordon. It would therefore be desirable to provide a method and material for separating stacked glass sheets coated with this material which prevents marring and which is compatible with normal production practices in the glass industry.

As noted above, polyethylene has previously been suggested as a possible interleaving material. For example, U.S. Pat. No. 4,011,359 to Simpkin et al discloses an interleaving material for separating glass sheets and protecting them from scratching and staining. The material comprises a porous, finely divided support material, impregnated with a weakly acidic material, and fine particles of a chemically inert plastic material. The inert plastic separator material may be polyethylene, polystyrene, polytetrafluoroethylene or a methacrylate polyester, and preferably has a larger particle size than the acid-impregnated support material. The interleaving material may be applied to the glass by conventional powder applicators.

U.S. Pat. No. 4,447,496 to Franz et al discloses a method of protecting glass surfaces by the treatment of the glass surfaces with an organotin compound prior to the application of a particulate interleaving material. While various interleaving materials, such as polyethylene, polystyrene, polytetrafluoroethylene and polyacrylate are suggested, Franz et al indicate that porous cellulose materials such as wood flour are preferred.

U.S. Pat. No. 2,995,533 to Parmer et al discloses a protective coating for glassware which is subjected to abrasive contact with other glassware during handling or shipment. An aqueous emulsion of polyethylene is applied to the glassware. It is noted that the molecular weight of the polyethylene can be as high as 2,000.

While the above materials do provide a measure of protection to normal clear glass, they fail to provide protection to pyrolytic coatings of tin oxide, particularly coatings that are relatively thick, e.g., so called Low-E coatings. It would therefore be desirable to supply a method and material for interleaving both uncoated and pyrolytically coated glass sheets which provides superior resistance to marring during storage or transportation of the glass sheets. In addition, it is desirable for the method and material to prevent the development of low pressures, or even a vacuum, between the stacked glass sheets which may inhibit unloading of the stacked glass sheets.

It must be noted that the prior art referred to hereinabove has been collected and examined only in light of the present invention as a guide. It is not to be inferred that such diverse art would otherwise be assembled absent the motivation provided by the present invention.

SUMMARY OF THE INVENTION

The present invention provides a method and material for protecting a glass surface from marring during shipment or storage of stacked glass sheets. An interleaving material comprised of polyethylene having a number average molecular weight of at least 100,000 is applied to one or both major surfaces of the glass sheets. The glass sheets are then stacked in face-to-face relation for shipment or storage.

The interleaving material in accordance with the present invention provides superior resistance to marring compared to prior art particulate interleaving materials, along with the dimensional stability and impact resistance required to prevent the development of a vacuum between the stacked glass sheets.

DETAILED DESCRIPTION OF THE PREFERRED EMBODIMENTS

In accordance with the invention, glass sheets are provided with a polyethylene interleaving material prior to stacking in a face-to-face relation. It has been determined, however, that a polyethylene having a number average molecular weight less than 100,000 still resulted in significant marring of a pyrolytically coated, specifically tin-oxide coated, glass sheet. In addition, these relatively low molecular weight polyethylenes were found to transfer material to the coated glass surface under the high loads experienced by an interleaving material in a typical arrangement of stacked glass sheets.

Accordingly, the interleaving material of the present invention is comprised of a polyethylene having a number average molecular weight of at least 100,000. Preferably, the number average molecular of the polyethylene interleaving material is at least 1,000,000. In a most preferred embodiment, the number average molecular weight of the polyethylene interleaving material is in the range of about 3 million to 6 million. The interleaving material of the invention exhibits excellent toughness, abrasion resistance, resistance to stress cracking and low moisture absorption, while retaining the low coefficient of friction typical of all polyethylenes.

These properties have been found to be critical in an interleaving material, especially when used with pyrolytically coated glass sheets. This is because the marring of tin-oxide coated glass sheets by a poly(methyl methacrylate) interleaving material is believed to be caused by a thin deposit of the poly(methyl methacrylate) on the tin-oxide coated surface, the marring sites having been identified by secondary ion mass spectrometry as poly(methyl methacrylate). In addition, electron microscopy of tin-oxide coated surfaces previously marred by a poly(methyl methacrylate) interleaving material fails to reveal any scratching of the surface.

The polyethylene interleaving material is formed of particles having an average size of between about 100 to 300 microns, and the particles may be of any suitable shape. The interleaving material may be formed of powder ground to the required size. From the standpoint of dimensional stability, it is preferable to form the interleaving material of generally spherical beads, although there may be production difficulties in forming polyethylene in these molecular weight ranges into generally spherical beads. The particle size should be large enough to provide sufficient separation between the stacked glass sheets to maintain the glass sheets in spaced-apart relationship and prevent the development of a vacuum between adjacent sheets, and small enough such that the tendency to settle to the bottom of a vertically disposed stack of glass sheets is reduced. A size range of 100 microns to 300 microns satisfy these requirements.

Further, polyethylenes, even those having number average molecular weights greater than 1,000,000, will undergo plastic deformation under static loads over time. Where the stacked glass sheets will remain in that arrangement for a relatively long time, the load on the polyethylene particles may cause some deformation, reducing the separation between adjacent glass sheets to the extent that a vacuum will develop. Thus, in a preferred embodiment, the average particle size is between about 150 microns and 300 microns, to allow for some deformation during long periods of storage and shipment.

The high molecular weight polyethylene interleaving material used in accordance with the invention, while providing improved resistance to marring, will not protect against the staining which may occur with pyrolytically coated stacked glass sheets. Therefore, the glass sheets are still treated with a conventional stain inhibitor, preferably an acid material. One preferred acid is adipic acid. The quantity of acid applied need only be enough to provide adequate stain protection to the glass surface.

A preferable method for the application of the acid material is by spraying an aqueous solution onto the surface of a glass ribbon during a float glass manufacturing process. For pyrolytically coated glass, the stain inhibitor is preferably applied to the coated surface.

The particulate polyethylene interleaving material may be applied to either major surface of the glass sheets in any suitable manner, either before or after the application of the stain inhibitor. Preferably, the interleaving material is electrostatically charged and dispersed on the surface of a glass ribbon during a float glass manufacturing process at a point where the glass ribbon is at or near ambient temperature. For pyrolytically coated glass, the interleaving material is also preferably applied to the coated surface.

The invention is more easily comprehended by reference to specific embodiments which are representative of the invention. It must be understood, however, that the specific embodiments are provided only for the purpose of illustration, and that the invention may be practiced otherwise than as specifically illustrated without departing from its spirit and scope.

EXAMPLES

Sheets of annealed soda-lime-silica glass were formed having a tin oxide coating deposited thereon and cut into 4"×8" sheets. The tin oxide coated surface of the glass sheets was dusted with a ground powder of the various interleaving materials to be tested at a rate of about 140 mg/ft$^2$. Two sheets at a time were mounted to a table and an uncoated glass sheet was placed over the samples. A 125 lbs. load was placed on the uncoated glass sheet, which was then moved relative to the samples for 250 strokes each 3/16 in length. Each sample was then washed in a conventional commercial glass washing machine using a water and detergent wash and a water rinse.

Eight samples were tested for each interleaving material, and the number of samples showing any marring was recorded. In addition, the total number of marred sites for each interleaving material was recorded. These results are shown in the Table below.

| MATERIAL | # OF SAMPLES | # OF SAMPLES WITH MARRING | TOTAL # OF MARRED SITES |
| --- | --- | --- | --- |
| HB 312 CM[1] | 8 | 3 | 3 |
| HOSTALLOY 731[2] | 8 | 2 | 2 |
| DOW HDPE TYPE 1V-10062N[3] | 8 | 4 | 11 |
| LDPE NA814-000[4] | 8 | 5 | ENTIRE SAMPLES MOTTLED |

1. Ultra high molecular weight polyethylene, 3 million to 6 million, available from HIMONT Incorporated.
2. Ultra high molecular weight polyethylene, 3 million to 6 million, available from Hoechst-Celanese.
3. High density polyethylene, number average molecular weight in the range of 150,000 to 350,000, available from Dow Plastics.
4. Low density polyethylene, number average molecular weight in the range of 70,000 to 90,000, available from Quantum Chemicals.

For comparison, identical glass samples were produced and dusted with poly(methyl methacrylate) and tested in the same manner as above. Eight out of eight such samples exhibited heavy mottling over most of the sheet.

What is claimed is:
1. An article of manufacturing comprising:
   a) a plurality of glass sheets positioned in a stack, each glass sheet having two major surfaces such that the major surfaces of adjacent glass sheets are in face-to-face relationship; and
   b) an interleaving material interposed between the major surfaces of adjacent glass sheets, said interleaving material having an average particle size of between about 100 to 300 microns and comprised of high density polyethylene having a number av- erage molecular weight of at least about 150,000 or ultra high molecular weight polyethylene having a number average molecular weight of at least about 1,000,000.

2. The article according to claim 1, wherein the polyethylene interleaving material has a number average molecular weight of at least 1,000,000.

3. The article according to claim 1, wherein the polyethylene interleaving material has a number average molecular weight of between about 3,000,000 and 6,000,000.

4. An article according to claim 1, wherein the polyethylene interleaving material is applied to a major surface of each of said glass sheets when said glass sheets are at approximately ambient temperature.

5. The article according to claim 1, wherein the polyethylene interleaving material has an average particle size of between about 150 to 300 microns.

6. The article according to claim 1, further comprising a coating of a stain inhibitor applied to at least one major surface of each piece of glass and interposed between adjacent glass sheets.

7. The article according to claim 6, wherein the stain inhibitor is an acid.

8. The article according to claim 7, wherein the acid is adipic acid.

* * * * *